US010692383B1

(12) United States Patent
Wang

(10) Patent No.: US 10,692,383 B1
(45) Date of Patent: Jun. 23, 2020

(54) METHOD FOR LOCATING VEHICLE AND ELECTRONIC DEVICE EMPLOYING THE METHOD

(71) Applicant: NANNING FUGUI PRECISION INDUSTRIAL CO., LTD., Nanning (CN)

(72) Inventor: Hon-Da Wang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/432,166

(22) Filed: Jun. 5, 2019

(51) Int. Cl.
*G08G 1/00* (2006.01)
*G01S 13/76* (2006.01)

(52) U.S. Cl.
CPC ............. *G08G 1/20* (2013.01); *G01S 13/765* (2013.01)

(58) Field of Classification Search
None
See application file for complete search history.

(56) References Cited

U.S. PATENT DOCUMENTS

| | | | | |
|---|---|---|---|---|
| 4,908,629 A | * | 3/1990 | Apsell ................. | G01S 5/02 340/426.15 |
| 7,561,102 B2 | * | 7/2009 | Duvall ................. | G01S 5/0027 340/426.19 |
| 7,609,174 B2 | * | 10/2009 | Tengler ................. | G08G 1/20 340/901 |
| 9,053,516 B2 | * | 6/2015 | Stempora ............... | G06Q 40/08 |
| 9,182,764 B1 | * | 11/2015 | Kolhouse .............. | G05D 1/0217 |
| 9,183,530 B2 | * | 11/2015 | Schwarz ................ | H04W 4/021 |
| 9,659,502 B1 | * | 5/2017 | Abebe .................. | G08G 5/0034 |
| 9,665,997 B2 | * | 5/2017 | Morgan ................ | G07C 5/0816 |
| 9,701,279 B1 | * | 7/2017 | Morgan ................ | B60R 25/102 |
| 9,865,020 B1 | * | 1/2018 | Hayward ............... | G07C 5/008 |
| 9,882,272 B2 | * | 1/2018 | Wyckoff ................ | H01Q 1/32 |
| 10,410,516 B1 | * | 9/2019 | Andersson ............ | G06K 9/3258 |
| 10,529,111 B1 | * | 1/2020 | Wu ....................... | G06T 13/205 |
| 2016/0019790 A1 | * | 1/2016 | Tobolski ............... | G08G 1/096838 340/932.2 |
| 2018/0096602 A1 | * | 4/2018 | She ...................... | G07C 5/0816 |
| 2018/0227704 A1 | * | 8/2018 | Itoh ...................... | G08G 1/096827 |
| 2019/0052915 A1 | * | 2/2019 | McQuillen ........... | G08G 1/096716 |

* cited by examiner

*Primary Examiner* — Fekadeselassie Girma
(74) *Attorney, Agent, or Firm* — ScienBiziP, P.C.

(57) ABSTRACT

A method for locating a vehicle left parked in a parking lot can be applied by an electronic device in the hands of the driver. The method generates a first data package based on the vehicle and the same is broadcast to other vehicles in the parking lot as a parking space is being found. A second data package is generated when the driver takes his electronic device away from the parked vehicle and sent to the other vehicles within a preset range. Upon the driver's return, the parked vehicle can generate a navigation path to itself. The navigation path sent by the parked vehicle is received by the electronic device, and the electronic device can prompt a driver to locate his/her own parked vehicle according to information of the navigation path.

23 Claims, 8 Drawing Sheets

METHOD FOR LOCATING VEHICLE AND ELECTRONIC DEVICE EMPLOYING THE METHOD

FIELD

The subject matter herein generally relates to communication technology.

BACKGROUND

When driving to an unfamiliar place and parking lot, a driver can locate a parking space and leave the vehicle there. When the driver returns, he or she may forget the location of the vehicle in the parking lot.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
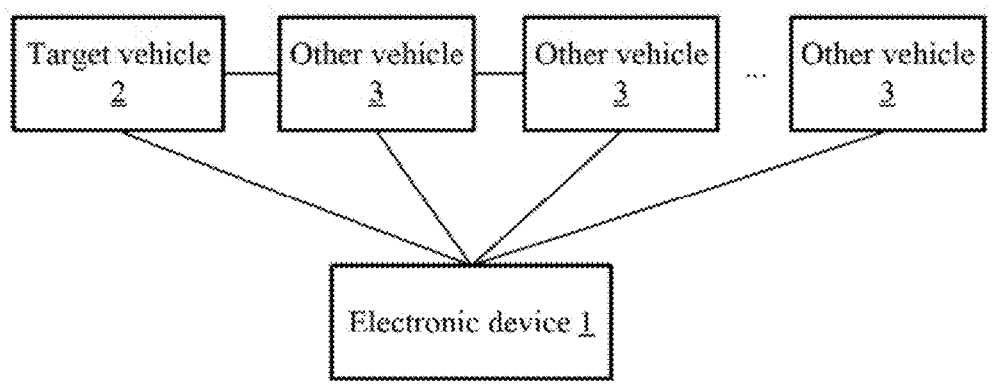
FIG. 1 illustrates a schematic diagram of one embodiment of an electronic device communicating with a plurality of vehicles.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY™, flash memory, and hard disk drives. The term "comprises" means "including, but not necessarily limited to"; it specifically indicates open-ended inclusion or membership in a so-described combination, group, series, and the like.

FIG. 1 illustrates an electronic device communicating with a plurality of vehicles. In at least one embodiment, the electronic device 1 can be in communication with a target vehicle 2 and at least one other vehicle 3. The target vehicle 2 and the other vehicles 3 are parked in a parking lot. The electronic device 1 is communicating with the target vehicle 2 through a first network (e.g., WIFI), and the target vehicle 2 is communicating with the other vehicles 3 through a second network (e.g., vehicle-to-vehicle (V2V) communication). The V2V communication technology provides a dedicated short range communication (DSRC) common spectrum channel for the target vehicle 2 and the other vehicles 3. It can be understood that the target vehicle 2 and the other vehicles 3 include a V2V communication unit (not shown), so that a vehicle within a range covered by the signal of the V2V can form a local network connection, which is convenient for the target vehicle 2 and the other vehicles 3.

Figure 2:
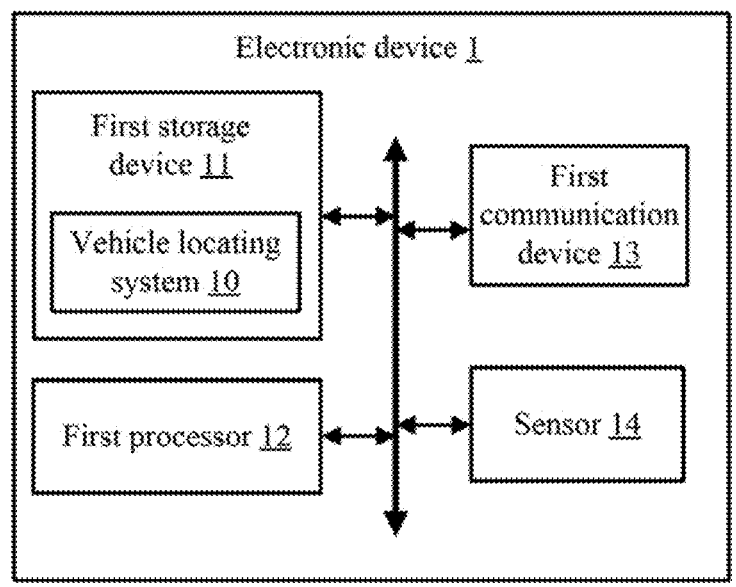
FIG. 2 is a block diagram of one embodiment of an electronic device of FIG. 1.

FIG. 2 shows an electronic device including a vehicle locating system. Depending on the embodiment, the electronic device 1 can include, but is not limited to, a first storage device 11, at least one first processor 12, a first communication device 13, and a sensor 14. The first storage device 11, at least one first processor 12, the first communication device 13, and the sensor 14 communicate with each other through a system bus.

In at least one exemplary embodiment, the electronic device 1 communicates with the target vehicle 2 and the other vehicles 3 through the first communication device 13. The target vehicle 2 communicates with the other vehicles 3 through the V2V communication unit.

In at least one exemplary embodiment, the sensor 14 can detect an elevation of the electronic device 1 and ground. For example, the sensor 14 can be a radar sensor.

In a scenario, a driver carries the electronic device 1 when he or she leaves the target vehicle 2 in a parking lot 100 for parking. There are a lot of other vehicles 3 surround the target vehicle 2. When the driver comes back to the parking lot 100, he/she can locate the target vehicle 2 through the electronic device 1 and the other vehicles 3. For example, the electronic device 1 generates a first data package when the driver is driving the target vehicle 2 in the parking lot 100, and broadcasts the first data package to other vehicles 3. The first data package includes information of the target vehicle 2. The electronic device 1 generates a second data package after the target vehicle 2 is actually parked in the parking lot 100, and stores the second data package into the first storage device 11. When the driver returns to the parking lot 100, the electronic device 1 sends the second data packet to the other vehicles 3 to locate which ones have received the first data package. The electronic device 1 further can locate the target vehicle 2 based on the vehicles which received the first data package, and prompt the driver to navigate to the target vehicle 2.

In at least one exemplary embodiment, the storage device 11 can be an internal storage device, such as a flash memory, a random access memory (RAM) for temporary storage of parameters, and/or a read-only memory (ROM) for permanent storage of parameters. The storage device 11 can also be an external storage device, such as an external hard disk, a storage card, or a data storage medium. The at least one processor 12 can be a central processing unit (CPU), a microprocessor, or other data processor chip that performs functions of the electronic device 1.

In at least one exemplary embodiment, the electronic device 1 can be, but is not limited to, a smart phone, a tablet computer, a vehicle key, or any other suitable electronic device. FIG. 2 illustrates only one example of the electronic device 1, other examples can comprise more or fewer components that those shown in the embodiment, or have a different configuration of the various components. For example, the electronic device 1 can further include a circuit system, input/output interface, a battery, an operating system, and so on.

Figure 7:
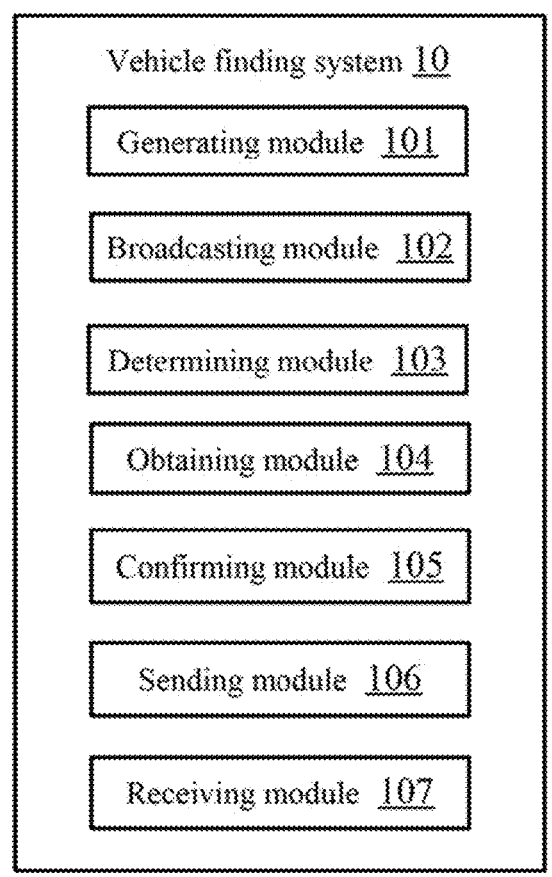
FIG. 7 is a block diagram of one embodiment of a vehicle locating system.

In at least one exemplary embodiment, the vehicle locating system 10 as shown in FIG. 7 can include, but is not limited to, a generating module 101, a broadcasting module 102, a determining module 103, an obtaining module 104, a confirming module 105, a sending module 106, and a receiving module 107. The modules 101-107 can comprise computerized instructions in the form of one or more computer-readable programs that can be stored in a non-transitory computer-readable medium, for example in the first storage device 11, and executed by the first processor 12 of the electronic device 1. Functions of the modules 101-107 are described with reference to FIG. 4.

Figure 3:
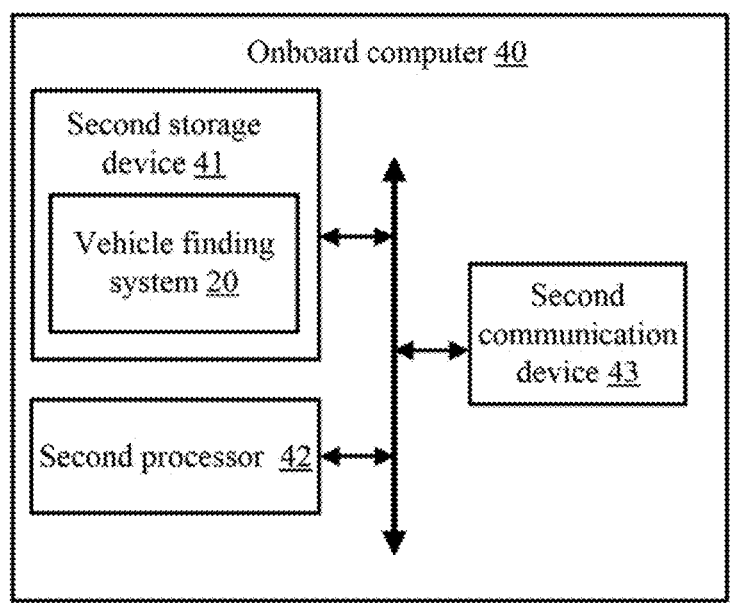
FIG. 3 is a block diagram of one embodiment of a vehicle FIG. 1.

FIG. 3 is a block diagram of one embodiment of a vehicle. Depending on the embodiment, the vehicle 4 can include an onboard computer 40. The onboard computer 40 can include, but is not limited to, a second storage device 41, at least one second processor 42, and a second communication device 43. The second storage device 41, the at least one second processor 42, and the second communication device 43 communicate with each other through a system bus.

In at least one exemplary embodiment, the vehicle 4 communicates with other vehicles through the second communication device 43. The second communication device 43 supplies communication function through the V2V technology.

In at least one exemplary embodiment, the target vehicle 2 and a plurality of other vehicles 3 surrounding the target vehicle 2 can each be a vehicle 4.

Figure 8:
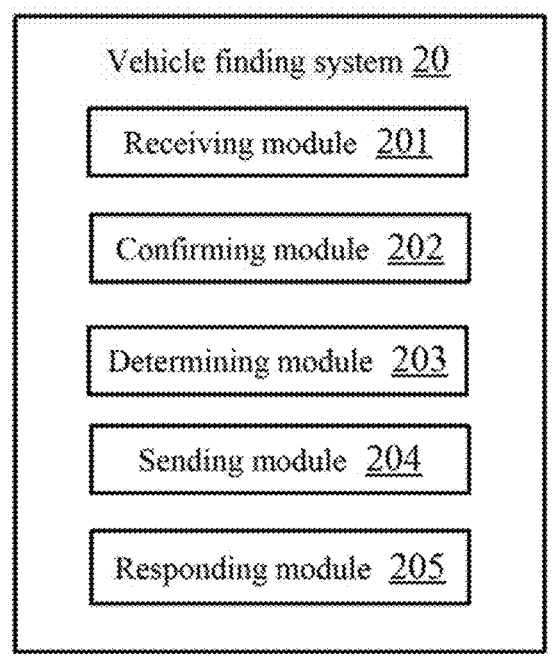
FIG. 8 is a block diagram of another embodiment of a vehicle locating system.

In at least one exemplary embodiment, the vehicle locating system 20 as shown in FIG. 8 can include, but is not limited to, a receiving module 201, a confirming module 202, a determining module 203, a sending module 204, and a responding module 205. The modules 201-205 can comprise computerized instructions in the form of one or more computer-readable programs that can be stored in a non-transitory computer-readable medium, for example in the second storage device 41, and executed by the second processor 42 of the vehicle 4. Functions of the modules 101-107 are described with reference to FIG. 5.

Figure 4:
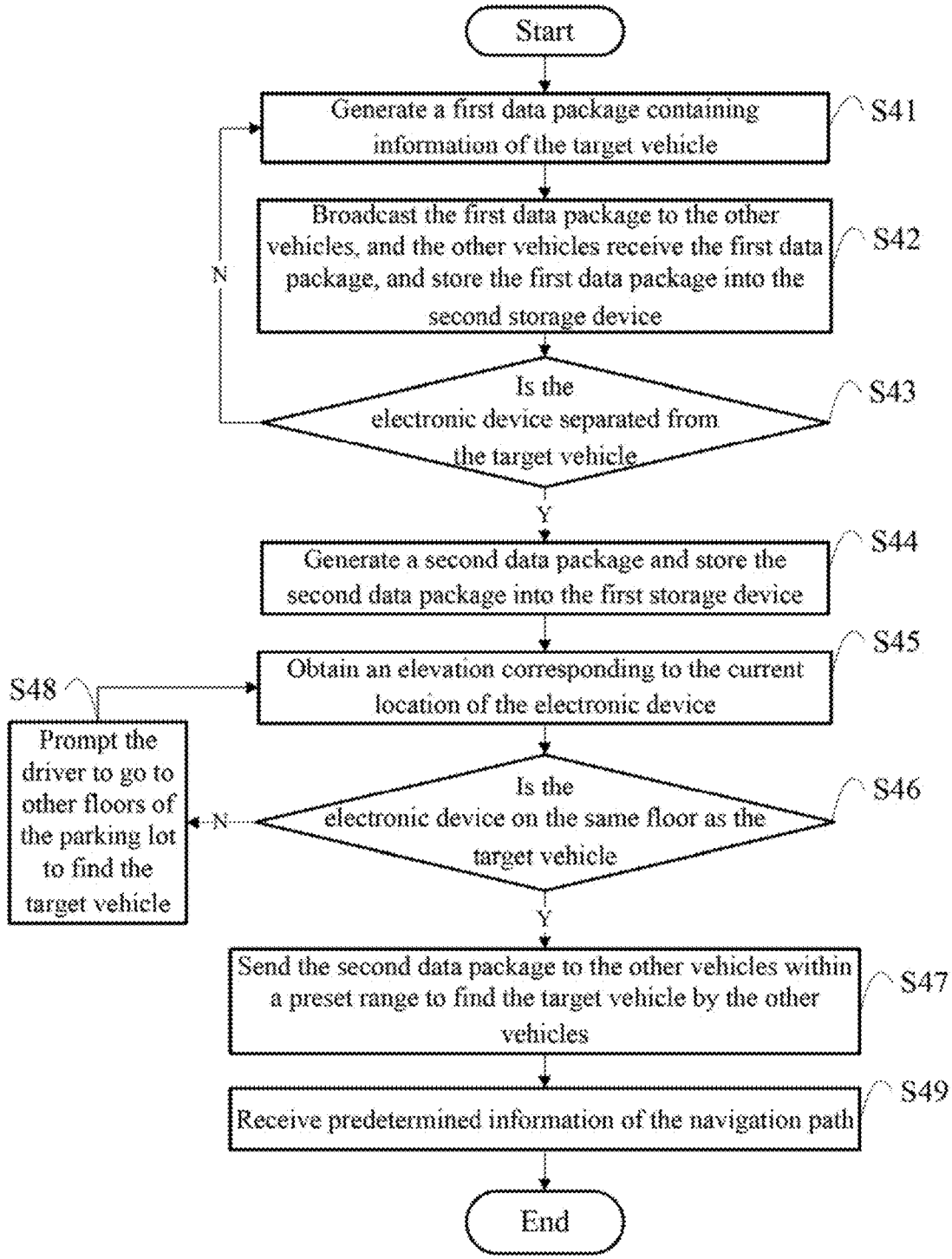
FIG. 4 illustrates a flowchart of one embodiment of a vehicle locating method using the electronic device of FIG. 1.

FIG. 4 illustrates a flowchart of a method for locating a vehicle. In an example embodiment, the method is performed by execution of computer-readable software program codes or instructions by the at least one processor 12 of the electronic device 1.

Referring to FIG. 4, the method is provided by way of example, as there are a variety of ways to carry out the method. The method described below can be carried out using the configurations illustrated in FIG. 2, for example, and various elements of these figures are referenced in explaining method. Each block shown in FIG. 4 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S41.

At block S41, the generating module 101 can generate a first data package containing information of the target vehicle 2.

In at least one exemplary embodiment, when the driver drives the target vehicle 2 into the parking lot 100, the electronic device 1 generates the first data package. The information of the target vehicle 2 includes an identification of the target vehicle 2, an elevation of the target vehicle 2, and time information. So the first data package includes the identification of the target vehicle 2, the elevation of the target vehicle 2, and time information. The identification of the target vehicle 2 may be information such as a license plate number that can uniquely identify the target vehicle 2. It should be noted that the elevation of the target vehicle 2 is equal to the elevation of the electronic device 1. The elevation is a vertical distance between current location of the target vehicle 2 and sea level. The elevation can be obtained by the sensor 14. It can be understood that the elevation can be a positive number or a negative number. When the parking lot 100 is a high-rise parking lot, the elevation is likely to be a positive number. When the parking lot 100 is an underground parking lot, the elevation can be a negative number.

In at least one exemplary embodiment, the time information includes a first time information and a second time information. The first time information is the current time when the driver is driving the target vehicle 2 in the parking lot 100 to locate a parking space, and the electronic device 1 sends the first data package to surrounding vehicles. That is the time when the target vehicle 2 is likely to be passing by the other vehicles 3. For example, the driver enters the parking lot 100 at 14:00, and the electronic device 1 may send the first data package to surrounding vehicle V1 at 14:01. Then, the first time information is 14:01.

In at least one exemplary embodiment, the second time information is likely a period of time, set by the driver, during which the other vehicles in the parking lot 100 are in close proximity with the target vehicle 2. For example, when the electronic device 1 sends the first data package to other vehicles and starts timing, the driver may input two hours for example until he/she returns to the parking lot 100 to drive his/her target vehicle 2 away.

In at least one exemplary embodiment, the elevation and the first time information of the first data package vary with the movement of the target vehicle 2. For example, the driver may drive the target vehicle 2 into a two-story parking lot 100 and finally search for a parking space on the first floor. The elevation is the distance between the first floor of the parking lot 100 and the sea level. When the first floor of the parking lot 100 has no free parking space, the driver may drive the target vehicle 2 into the second floor of the parking lot 100. The elevation is then the distance between the second floor of the parking lot 100 and sea level. The first time information can change as the driver drives into and around the parking lot 100.

At block S42, the broadcasting module 102 can broadcast the first data package to the other vehicles 3, and the other vehicles 3 receive the first data package, and store the first data package into the second storage device 42.

In at least one exemplary embodiment, the other vehicles 3 can receive the first data package through the V2V communication unit, and store the first data package into the second storage device 42. When the driver returns to the parking lot 100 for his/her target vehicle 2, the electronic device 1 can help the driver to locate the target vehicle 2 based on the other vehicles 3 which have received the first data package.

In at least one exemplary embodiment, in order to save energy, the electronic device 1 can broadcast the generated first data package to other vehicles 3 at preset times. For example, the preset times may be two seconds or five seconds. The preset times must be frequent, as the elevation and the first time information are constantly changing when the driver drives the target vehicle 2 into the parking lot 100 for locating a parking space. If the preset times contain long intervals, the elevation may be changed.

At block S43, the determining module 103 can determine whether the electronic device 1 has separated from the target vehicle 2. When the electronic device 1 has separated from the target vehicle 2, the process goes to block S44. When the electronic device 1 does not have separated from the target vehicle 2, the process returns to block S41.

In at least one exemplary embodiment, when the electronic device 1 is a vehicle key, the determining module 103 can determine whether the electronic device 1 has left the target vehicle 2 based on a door-locking signal from the vehicle key. When the electronic device 1 is a mobile terminal, the determining module 103 can determine whether the electronic device 1 has left the target vehicle 2 based on air pressure sensed by a pressure sensor (not shown) or by temperature sensed by a temperature sensor (not shown). For example, when the air pressure changes exceed the preset range within the first preset time, the determining module 103 can determine that the driver has left the target vehicle 2 carrying the device 1.

At block S44, the generating module 101 can generate a second data package and store the second data package into the first storage device 11.

In at least one exemplary embodiment, the second data package is a newly generated first data package after the driver parks the target vehicle 2. As the electronic device 1 continuously generates the first data package during the driver locating a parking space and parks the target vehicle 2 in the parking space. The elevation and the first time information may be changing all the time. The electronic device 1 may record a newly generated first data package after the driver parks the target vehicle 2. When the driver returns to the parking lot 100, the electronic device 1 can locate the target vehicle 2 based on the second data package.

Through the block S41 to block S44, the electronic device 1 can generate a first data package continuously when the driver drives the target vehicle 2 into the parking lot 100 and parks the target vehicle 2 in a parking space, and leaves the target vehicle 2. The electronic device 1 can broadcast the first data packages to the other vehicles 3, and record at least the latest or the last first data package of the target vehicle 2 in the parking lot 100 in real time through the other vehicles 3.

It can be understood that after the driver parks the target vehicle 2, he/she will leave the target vehicle 2 for a period of time, and then return to the parking lot 100 to locate the target vehicle 2. When the driver carries the electronic device 1 as he/she leaves the target vehicle 2, the electronic device 1 stores the second data packet. When the driver returns to the parking lot 100, the electronic device 1 can locate the target vehicle 2 based on the second data package, as hereinafter described.

At block S45, the obtaining module 104 can obtain an elevation corresponding to the current location of the electronic device 1.

In at least one exemplary embodiment, when the driver returns to the parking lot 100 to locate the target vehicle 2, the sensor 14 can obtain the elevation corresponding to the current location of the electronic device 1.

In at least one exemplary embodiment, the vehicle locating method further can include a step for determining whether the electronic device 1 is connected to the network or not connected to the network.

At block S46, the confirming module 105 can determine whether the electronic device 1 is on the same floor as the target vehicle 2 at the parking lot 100 according to the obtained elevation. When the electronic device 1 is on the same floor as the target vehicle 2 at the parking lot 100, the process goes to block S47. When the electronic device 1 is on the different floor as the target vehicle 2 at the parking lot 100, the process goes to block S48.

In at least one exemplary embodiment, the confirming module 105 can determine whether the electronic device 1 and the target vehicle 2 are on the same floor of the parking lot 100 by determining whether the current location of the electronic device 1 and the location of the target vehicle 2 is at the same elevation. The determining module 103 can compare the obtained elevation with the elevation of the second data package to determine whether the current location of the electronic device 1 and the location of the target vehicle 2 are at the same elevation. When an absolute of a difference between the obtained elevation and the elevation of the second data package is less than or equal to a predetermined elevation, the determining module 103 can determine that the current location of the electronic device 1 and the location of the target vehicle 2 are at the same floor. When the absolute of a difference between the obtained elevation and the elevation of the second data package is greater than the predetermined elevation, the determining module 103 can determine that the current location of the electronic device 1 and the location of the target vehicle 2 are at different floors.

It should noted that the current location of the electronic device 1 and the location of the target vehicle 2 being at the same elevation means the electronic device 1 and the target vehicle 2 are on the same floor of the parking lot 100. So the predetermined elevation can greater than or equal to zero and less than or equal to half of the floor-to-floor elevation of the parking lot 100. For example, when the floor-to-floor elevation of the parking lot 100 is three meters, the predetermined elevation is greater than or equal to zero and less than or equal to 1.5 meters.

At block S47, the sending module 106 can send the second data package to the other vehicles 3 within a preset range to locate the target vehicle 2.

Figure 6:
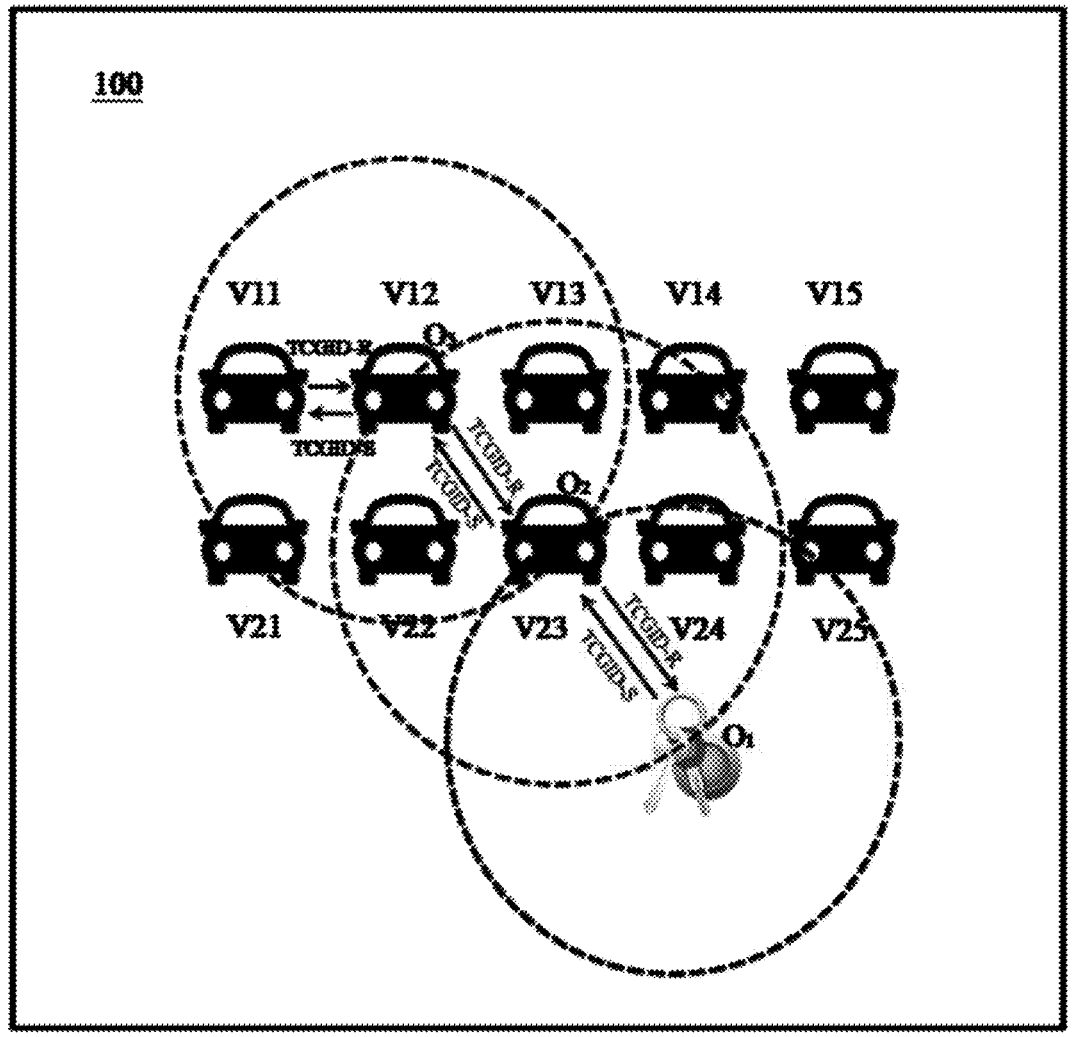
FIG. 6 illustrates a parking lot in which a target vehicle may be located.

In at least one exemplary embodiment, the process of utilizing the other vehicles 3 in the parking lot 100 to locate the target vehicle 2 includes:

(a) the electronic device 1 sending the second data package to the other vehicles 3 within the preset range. The preset range is a circle (as shown in FIG. 6), a center of the circle is the location of the electronic device 1, and a radius of the circle is communication distance between the electronic device 1 and the other vehicles 3.

(b) the other vehicles 3 receive the second data package through the first network.

(c) the sending module 105 can determine whether at least one candidate vehicle exists among the other vehicles 3. A candidate vehicle is a vehicle that has received first data package of the target vehicle 2. When at least one candidate vehicle exists among the other vehicles 3, the process goes to (d); when no candidate vehicle exists among the other vehicles 3, the process goes to (g).

After the other vehicles 3 receive the second data package, the other vehicles 3 can compare the second data package with the first data package to determine whether at least one candidate vehicle exists in the other vehicles 3. When the identification information of the second data package is the same as the identification information of the first data package, the other vehicles 3 can determine that at least one candidate vehicle exists among the other vehicles 3. When the identification information of the second data package is different from the identification information of the first data package, the other vehicles 3 can determine that no candidate vehicle exists among the other vehicles 3.

It can be understood that there may be one or more than one candidate vehicle within the preset range.

(d) the confirming module 105 confirms a path vehicle from the at least one candidate vehicle, and the path vehicle is the last one vehicle of the at least one candidate vehicle which has received the first data package.

When there is a candidate vehicle within the preset range, the candidate vehicle is the path vehicle. When there are many candidate vehicles within the preset range, the path vehicle is chosen from many candidate vehicles by back-propagation (BP) algorithm. The formulas of the BP algorithm can be:

$$BP_0 = \lfloor 0, (2^{c+1} - 1) \rfloor, 0 < t_i < \frac{1}{k}T;$$

$$BP_1 = \left[\sum_{n=0}^{1} (2^{c+n}), \sum_{n=1}^{2} (2^{c+n} - 1)\right], \frac{1}{k}T < t_i < \frac{2}{k}T;$$

$$\ldots$$

$$BP_k = \left[\sum_{n=k-1}^{k} (2^{c+n}), \sum_{n=k}^{k+1} (2^{c+n} - 1)\right], T < t_i < \infty.$$

The BP value is a backoff parameter, and the BP value is a maximum backoff value or a minimum backoff value when a conflict occurs. T is the second time information, and $t_i$ is the time when the other vehicles 3 contact the target vehicle 2. For example, $t_i$ s the time from the other vehicles 3 receiving the first data package to the other vehicles 3 receiving the second data package. K is a class number. C is an adjustable parameter for difference in degrees of classification.

In at least one exemplary embodiment, the BP value is a weight value of the candidate vehicle as the path vehicle which calculated based on the first time information and the second time information. The smaller the BP value, the greater weight of the candidate vehicle as the path vehicle. Therefore, it is determined that the vehicle in the other vehicles 3 that has received the first data packet and stores the first data packet for the shortest time, and it is easier to obtain a small BP value. Thereby, the path vehicle in the candidate vehicle is determined, and the feedback data of the path vehicle is preferentially received, and the second data package is preferentially transmitted to the other vehicles 3 through the path vehicle. Not all of the candidate vehicles are required to transmit the second data packet to the other vehicles 3, so that unnecessary package transmissions can be reduced.

For example, when c=0 and k=5, the BP value can be calculated as follows:

$$BP_0 = [0, 1], 0 < t_i \leq \frac{1}{5}T;$$

$$BP_1 = [3, 4], \frac{1}{5}T < t_i \leq \frac{2}{5}T;$$

$$BP_2 = [6, 10], \frac{2}{5}T < t_i \leq \frac{3}{5}T;$$

$$BP_3 = [12, 22], \frac{3}{5}T < t_i \leq \frac{4}{5}T;$$

$$BP_4 = [24, 46], \frac{4}{5}T < t_i \leq T;$$

$$BP_5 = [48, 94], T < t_i \leq \infty.$$

If T=10 and $t_i$=2, the BP value of a current vehicle is $BP_0$. That is the heaviest weighting of the current vehicle, and the current vehicle is determined as the path vehicle.

(d) the confirming module 105 determines whether the path vehicle is the target vehicle. In at least one exemplary embodiment, the path vehicle can send feedback information to the electronic device 1, and the feedback information includes the second data package and the identification information of the path vehicle. When the identification information of the path vehicle is the same as the identification information of the target vehicle 2 of the second data package, the confirming module 105 determines that the path vehicle is the target vehicle 2. When the identification information of the path vehicle is different from the identification information of the target vehicle 2 of the second data package, the confirming module 105 determines that the path vehicle is not the target vehicle 2.

(e) When the path vehicle is not the target vehicle 2, the path vehicle can send the second data package and identification information of the path vehicle to the other vehicles 3 within a second preset range, and the process returns to (b). So that the other vehicles 3 in the second preset range will continue to search for the target vehicle 2.

In at least one exemplary embodiment, the second preset range is a circle (as shown in FIG. 6). A center of the circle is the location of the path vehicle, and a radius of the circle is communication distance between the path vehicle and the other vehicles 3.

(f) When the path vehicle is the target vehicle 2, the target vehicle 2 can send predetermined information of a navigation path to the electronic device 1. The predetermined information includes identifications and locations of the target vehicle 2 and the path vehicles.

(f) The other vehicles 3 within the preset range can send the second data package to the vehicles within the second preset range, and then the process returns to (b).

At block S48, the receiving module 107 prompts the driver to go to other floors of the parking lot 100 to locate the target vehicle 2, then the process returns to block S45.

In at least one exemplary embodiment, when the electronic device 1 and the target vehicle 2 are at different floors of the parking lot 100, the receiving module 107 can prompt the driver to go to other floors of the parking lot 100 by voice or words. For example, the electronic device 1 can issue a voice prompt of "Your car not on this level, go to other level" through a loudspeaker (not shown).

At block S49, the receiving module 107 can receive predetermined information of the navigation path. The predetermined information can include identifications and locations of the target vehicle 2 and the path vehicles.

In at least one exemplary embodiment, when the other vehicles 3 can locate the target vehicle 2 in the parking lot 100, the navigation path based on the location of the target vehicle 2 and the path vehicle is generated, and the target vehicle 2 and the path vehicle feed identification information back to the electronic device 1. Then the driver can locate the target vehicle 2 according to the path vehicle and the target vehicle 2. For example, the driver can locate the target vehicle 2 according to lights turned on by the path vehicle and the target vehicle 2, or by horn being blown by the path vehicle and the target vehicle 2. The vehicle locating method can locate the target vehicle 2 in the parking lot 100 through the network and the V2V technology, without acquiring GPS information of the target vehicle 2 and the path vehicle. The vehicle locating method further can overcome problem of inaccurate assessment or indication of the position of the target vehicle 2 by GPS system.

Figure 5:
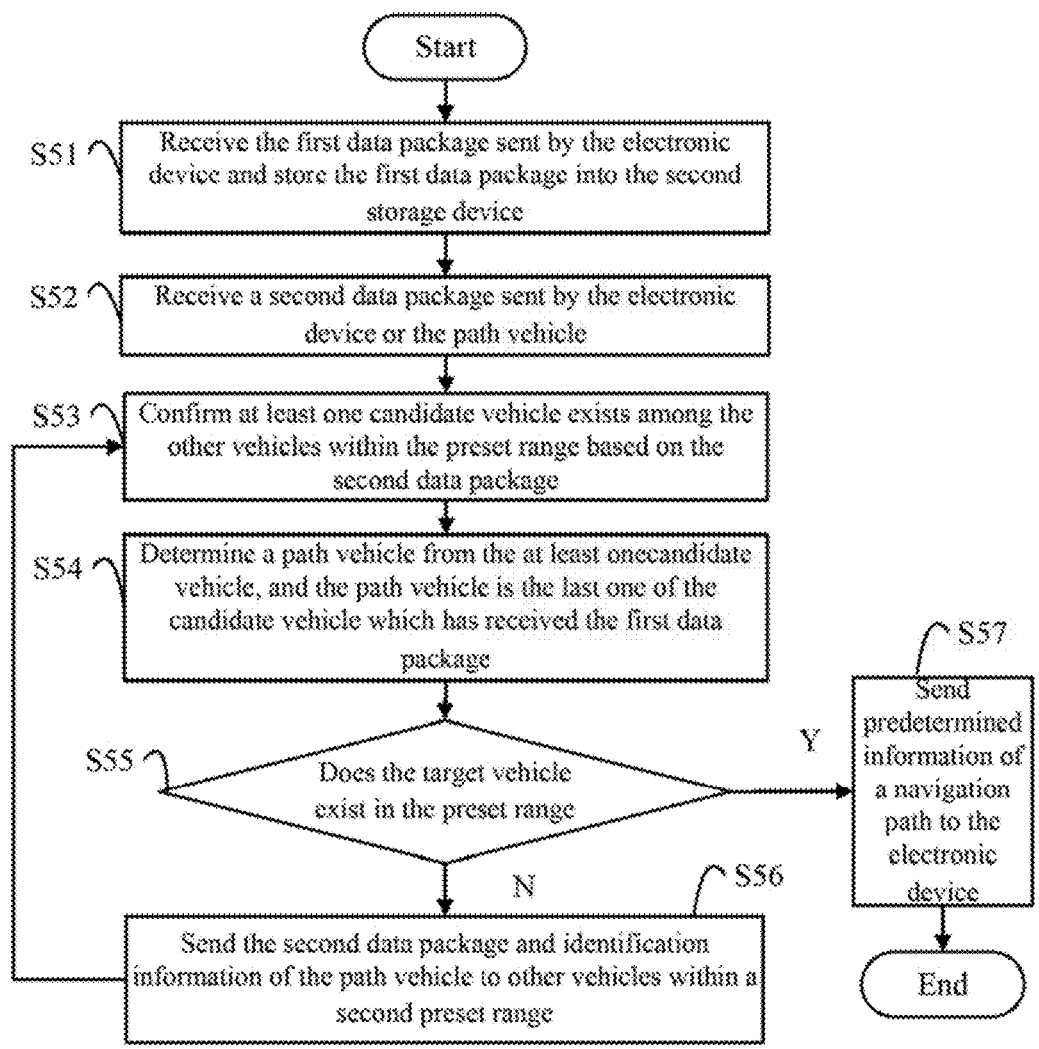
FIG. 5 illustrates a flowchart of one embodiment of a vehicle locating method using the vehicles of FIG. 1.

FIG. 5 illustrates a flowchart of a method for locating the vehicle. In an example embodiment, the method is performed by execution of computer-readable software program codes or instructions by the second processor 42 of the onboard computer 40 of the vehicle 4.

Referring to FIG. 5, the method is provided by way of example, as there are a variety of ways to carry out the method. The method described below can be carried out using the configurations illustrated in FIG. 3, for example, and various elements of these figures are referenced in explaining method. Each block shown in FIG. 5 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S51.

At block S51, the receiving module 201 can receive the first data package sent by the electronic device 1, and store the first data package into the second storage device 41.

In at least one exemplary embodiment, when the driver drives the target vehicle 2 into the parking lot 100, the electronic device 1 generates a first data package containing information of the target vehicle 2, and broadcast the first data package to the other vehicles 3 surrounding the electronic device 1. Then, the other vehicles 3 receive the first data package and store the first data package into the second storage device 41.

In at least one exemplary embodiment, the first data package includes an identification of the target vehicle 2, an elevation of the target vehicle 2, and time information. The time information includes a first time information and a second time information. The first time information is the current time when the driver is driving the target vehicle 2 in the parking lot 100 to locate a parking space, and the electronic device 1 sends the first data package to surrounding vehicles. That is the time when the target vehicle 2 is likely to be passing by the other vehicles 3. For example, the driver enters the parking lot 100 at 14:00, and the electronic device 1 may send the first data package to surrounding vehicle V1 at 14:01.

In at least one exemplary embodiment, the second time information is likely a period of time, set by the driver, during which the other vehicles in the parking lot 100 are in close proximity with the target vehicle 2. For example, when the electronic device 1 sends the first data package to other vehicles and starts timing, the driver may input two hours for example until he/she returns to the parking lot 100 to drive his/her target vehicle 2 away.

At block S52, the receiving module 201 can receive a second data package sent by the electronic device 1 or the path vehicle.

In at least one exemplary embodiment, the second data package is a newly generated first data package after the driver parks the target vehicle 2. As the electronic device 1 continuously generates the first data package during the driver locating a parking space and parks the target vehicle 2 in the parking space. The elevation and the first time information may be changing all the time. The electronic device 1 may record a newly generated first data package after the driver parks the target vehicle 2. When the driver returns to the parking lot 100, the electronic device 1 can locate the target vehicle 2 based on the second data package.

When the driver returns to the parking lot 100 to locate the target vehicle 2, the electronic device 1 can send the second data package to the other vehicles 3 within the preset range, and the other vehicles 3 can receive the second data package.

At block S53, the confirming module 202 can confirm at least one candidate vehicle exists among the other vehicles 3 within the preset range based on the second data package.

In at least one exemplary embodiment, a candidate vehicle is a vehicle that has received first data package of the target vehicle 2. After the other vehicles 3 receive the second data package, the other vehicles 3 can compare the second data package with the first data package to determine whether the at least one candidate vehicle exists in the other vehicles 3. When the identification information of the second data package is the same as the identification information of the first data package, the confirming module 202 can determine that at least one candidate vehicle exists among the other vehicles 3. When the identification information of the second data package is different from the identification information of the first data package, the confirming module 202 can determine that no candidate vehicle exists among the other vehicles 3.

It can be understood that there may be one or more than one candidate vehicle within the preset range.

It should be noted that the other vehicles 3 within the preset range may be not the candidate vehicle. Then, the current vehicle can send the second data package to the other vehicles 3 within a second preset range, until the confirming module 202 confirms that the current vehicle is the candidate vehicle.

At block S54, the determining module 203 can determine a path vehicle from the candidate vehicle, and the path vehicle is the last one vehicle of the candidate vehicle which has received the first data package.

In at least one exemplary embodiment, when there is a candidate vehicle within the preset range, the candidate vehicle is the path vehicle. When there are many candidate vehicles within the preset range, the path vehicle is chosen from many candidate vehicles by BP algorithm. The specific BP algorithm is referred to above and will not be described here.

In at least one exemplary embodiment, the BP value is a weight value of the candidate vehicle as the path vehicle which calculated based on the first time information and the second time information. The smaller the BP value, the greater weight of the candidate vehicle as the path vehicle. Therefore, it is determined that the vehicle in the other vehicles 3 that has received the first data packet and stores the first data packet for the shortest time, and it is easier to obtain a small BP value. Thereby, the path vehicle in the candidate vehicle is determined, and the feedback data of the path vehicle is preferentially received, and the second data package is preferentially transmitted to the other vehicles 3 through the path vehicle. Not all of the candidate vehicles are required to transmit the second data packet to the other vehicles 3, so that unnecessary package transmissions can be reduced.

At block S55, the determining module 203 can determine whether the target vehicle 2 exists in the preset range. When the target vehicle 2 exists in the preset range, the process goes to block S56. When the target vehicle 2 does not exist in the preset range, the process goes to block S57.

In at least one exemplary embodiment, the path vehicle can send feedback information to the other vehicles 3, and the feedback information includes the second data package and the identification information of the path vehicle. When the identification information of the path vehicle is the same as the identification information of the target vehicle 2 of the second data package, the determining module 103 determines that the path vehicle is the target vehicle 2. When the identification information of the path vehicle is different from the identification information of the target vehicle 2 of the second data package, the determining module 103 determines that the path vehicle is not the target vehicle 2.

At block 56, the sending module 204 can send the second data package and identification information of the path vehicle to the other vehicles 3 within a second preset range, and the process returns to block S52. So that the other vehicles 3 in the second preset range will continue to search for the target vehicle 2.

In at least one exemplary embodiment, the second preset range is a circle (as shown in FIG. 6). A center of the circle is the location of the path vehicle, and a radius of the circle is communication distance between the path vehicle and the other vehicles 3.

At block S57, the responding module 205 can send predetermined information of a navigation path to the electronic device 1 when the target vehicle 2 exists within the preset range.

In at least one exemplary embodiment, when the other vehicles 3 locate the target vehicle 2 in the parking lot 100, the navigation path based on the location of the target vehicle 2 and the path vehicle is generated, and the target vehicle 2 and the path vehicle feedback identification information to the electronic device 1. Then the driver can locate the target vehicle 2 according to the path vehicle and the target vehicle 2. For example, the driver can locate the target vehicle 2 according to lights turned on by the path vehicle and the target vehicle 2, or by horn being blown by the path vehicle and the target vehicle 2. The vehicle locating method can locate the target vehicle 2 in the parking lot 100 through the network and the V2V technology, without acquiring GPS information of the target vehicle 2 and the path vehicle. The vehicle locating method further can overcome problem of inaccurate assessment or indication of the position of the target vehicle 2 by GPS system.

FIG. 6 is a schematic diagram illustrating a parking lot for locating the target vehicle. In at least one exemplary embodiment, the electronic device 1 takes a vehicle key as an example. There are ten vehicles in the parking lot 100, for example, the vehicles V11-V15 and vehicles V21-V25. When the driver carrying the vehicle key returns to the parking lot 100 to locate the target vehicle 2, the vehicle key sends the second data package TCGID-S to the other vehicles 3 within the circle $O_1$. For example, the vehicles V23, V24, and V25 as shown in FIG. 6. A center of the circle $O_1$ is the position of the vehicle key, and a radius of the circle $O_1$ is communication distance between the vehicle key and the other vehicles 3. The vehicles V23, V24, and V25 receive the second data package separately. The vehicle V23 compares the second data package with the first data package which stored in the vehicle V23, and determines whether the vehicle V23 is a candidate vehicle. The vehicle V24 compares the second data package with the first data package which stored in the vehicle V24, and determines whether the vehicle V24 is a candidate vehicle. The vehicle V25 compares the second data package with the first data package which stored in the vehicle V25, and determines whether the vehicle V25 is a candidate vehicle. When the vehicles V23 and V24 are the candidate vehicles, the vehicles V23 and V24 determine which one is the path vehicle by the BP algorithm. When the BP value of the vehicle V23 is smaller than the BP value of the vehicle V24, it is determined that the vehicle V23 is the path vehicle. The path vehicle V23 response a data package TCGID-R including the second data package TCGID-S and identification information ID23 to the vehicle key. The vehicle key determines whether the path vehicle V23 is the target vehicle 2 according to the identification information ID23. When the identification information ID23 is different from the identification information of the target vehicle 2, it is determined that the path vehicle V23 is not the target vehicle 2.

The path vehicle V23 sends the second data package TCGID-S and identification information ID23 to the other vehicles 3 within the circle $O_2$. For example, the vehicles V22, V24, V12, V13, and V14 as shown in FIG. 6. A center of the circle $O_2$ is the position of the path vehicle V23, and a radius of the circle $O_2$ is communication distance between the path vehicle V23 and the other vehicles 3. The vehicles V22, V24, V12, V13, and V14 receive the second data package TCGID-S and identification information ID23 separately. The vehicle V22 compares the second data package with the first data package which stored in the vehicle V22, and determines whether the vehicle V22 is a candidate vehicle. The vehicle V24 compares the second data package with the first data package which stored in the vehicle V24, and determines whether the vehicle V24 is a candidate vehicle. The vehicle V12 compares the second data package with the first data package which stored in the vehicle V12, and determines whether the vehicle V12 is a candidate vehicle. The vehicle V13 compares the second data package with the first data package which stored in the vehicle V13, and determines whether the vehicle V13 is a candidate vehicle. The vehicle V14 compares the second data package with the first data package which stored in the vehicle V14, and determines whether the vehicle V14 is a candidate vehicle. When the vehicles V12, V13 and V14 are the candidate vehicles, the vehicles V12, V13 and V14 determine which one is the path vehicle by the BP algorithm. When the BP value of the vehicle V12 is smaller than the BP value of the vehicle V13 and the BP value of the vehicle V14, it is determined that the vehicle V12 is the path vehicle. The path vehicle V12 response a data package TCGID-R including the second data package TCGID-S and identification information ID12 to the vehicle V23. The vehicle V23 determines whether the path vehicle V12 is the target vehicle 2 according to the identification information ID12. When the identification information ID12 is different from the identification information of the target vehicle 2, it is determined that the path vehicle V12 is not the target vehicle 2.

The path vehicle V12 sends the second data package TCGID-S and identification information ID12 to the other vehicles 3 within the circle $O_3$. For example, the vehicles V11, V12, V13, V21, V22, and V23 as shown in FIG. 6. A center of the circle $O_3$ is the position of the path vehicle V12, and a radius of the circle $O_3$ is communication distance between the path vehicle V12 and the other vehicles 3. The vehicles V11, V12, V13, V21, V22, and V23 receive the second data package TCGID-S and identification information ID12 separately. The vehicle V11 compares the second data package with the first data package which stored in the vehicle V11, and determines whether the vehicle V11 is a candidate vehicle. The vehicle V12 compares the second data package with the first data package which stored in the vehicle V12, and determines whether the vehicle V12 is a candidate vehicle. The vehicle V12 compares the second data package with the first data package which stored in the vehicle V13, and determines whether the vehicle V13 is a candidate vehicle. The vehicle V21 compares the second data package with the first data package which stored in the vehicle V21, and determines whether the vehicle V21 is a candidate vehicle. The vehicle V22 compares the second data package with the first data package which stored in the vehicle V22, and determines whether the vehicle V22 is a candidate vehicle. The vehicle V23 compares the second data package with the first data package which stored in the vehicle V23, and determines whether the vehicle V23 is a candidate vehicle. When the vehicles V11, V12 and V13 are the candidate vehicles, the vehicles V11, V12 and V13 determine which one is the path vehicle by the BP algorithm. When the BP value of the vehicle V11 is the smallest among the BP value of the vehicles V12 and V13, it is determined that the vehicle V11 is the path vehicle. The path vehicle V11 response the second data package TCGID-S and identification information ID to the vehicle V12. The vehicle V12 determines whether the path vehicle V11 is the target vehicle 2 according to the identification information ID11. When the identification information ID11 is the same as the identification information of the target vehicle 2, it is determined that the path vehicle V11 is the target vehicle 2. Then, the target vehicle V11 responses the second data package TCGID-R and identification information ID to the vehicle V12, and the vehicle 12 responses the second data package TCGID-R and identification information ID12 to the vehicle V23, and the vehicle V23 responses the second data package TCGID-R and identification information ID23 to the vehicle key. Thereby, the target vehicle 2 is found and the vehicle information (e.g, ID12 and ID 23) of the navigation path is received.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device communicating with a target vehicle and a plurality of other vehicles, the electronic device comprising:
    a storage device;
    at least one processor; and
    the storage device storing one or more programs that, when executed by the at least one processor, cause the at least one processor to:
    generate a first data package containing information of the target vehicle;
    broadcast the first data package to the other vehicles, the first data package being configured to be received and stored by the other vehicles;
    generate a second data package when the electronic device is separated from the target vehicle;
    send the second data package to the other vehicles within a preset range;
    locate the target vehicle according to the first data package and the second data package through the other vehicles; and
    receive predetermined information of a navigation path.

2. The electronic device according to claim 1, wherein the first data package comprising an identification of the target vehicle, an elevation of the target vehicle, a first time information, and a second time information, and the elevation is a vertical distance between a current location of the target vehicle and sea level, the first time information is a time when the target vehicle is being driven into a parking lot, and the electronic device sends the first data package to the other vehicles, and the second time information is set manually.

3. The electronic device according to claim 2, wherein the at least one processor is further caused to:
    obtain an elevation corresponding to the current location of the electronic device;
    determine whether the electronic device and the target vehicle are on the same floor of the parking lot by comparing the obtained elevation with an elevation of the target vehicle contained in the second data package; wherein
    the electronic device and the target vehicle are on the same floor when an absolute of a difference between the obtained elevation and the elevation of the target vehicle in the second data package is less than or equal to a predetermined elevation; and
    the electronic device and the target vehicle are at different elevations when an absolute of a difference between the obtained elevation and the elevation of the target vehicle in the second data package is greater than the predetermined elevation.

4. The electronic device according to claim 2, wherein the at least one processor is further caused to:
    send the second data package to the other vehicles within a preset range;
    determine whether at least one candidate vehicle exists among the other vehicles;
    confirm a path vehicle from the candidate vehicle when the at least one candidate vehicle exists among the other vehicles, wherein the path vehicle is the last one of the candidate vehicle which has received the first data package;
    determine whether the path vehicle is the target vehicle;
    receive the predetermined information of the navigation path when the path vehicle is the target vehicle, wherein the predetermined information comprising identifications and locations of the target vehicle and the path vehicle.

5. The electronic device according to claim 4, wherein the at least one processor is further caused to:
    determine that at least one candidate vehicle exists among the other vehicles when the identification information of the second data package is the same as the identification information of the first data package; and determine that no candidate vehicle exists among the other vehicles when the identification information of the second data package is different from the identification information of the first data package.

6. The electronic device according to claim 4, wherein the at least one processor is further caused to:

calculate a backpropagation (BP) value of the candidate vehicles based on the first time information and the second time information; and select the vehicle with a smallest BP value from the candidate vehicles as the path vehicle.

7. The electronic device according to claim 6, wherein the at least one processor is further caused to:

receive identification information of the path vehicle;

determine that the path vehicle is the target vehicle when the identification information of the path vehicle is the same as the identification information of the target vehicle of the second data package; and determine that the path vehicle is not the target vehicle when the identification information of the path vehicle is different from the identification information of the target vehicle of the second data package.

8. A vehicle locating method applied in an electronic device, the electronic device communicating with a target vehicle and a plurality of other vehicles, the method comprising:

generating a first data package containing information of a target vehicle;

broadcasting the first data package to other vehicles, the first data package being configured to be received and stored by the other vehicles;

generating a second data package when the electronic device is separated from the target vehicle;

sending the second data package to the other vehicles within a preset range;

locating the target vehicle according to the first data package and the second data package through the other vehicles; and receiving predetermined information of a navigation path.

9. The method according to claim 8, wherein the first data package comprising an identification of the target vehicle, an elevation of the target vehicle, a first time information, and a second time information, and the elevation is a vertical distance between a current location of the target vehicle and sea level, the first time information is a time when the target vehicle is being driven into a parking lot, and the electronic device sends the first data package to the other vehicles, and the second time information is set manually.

10. The method according to claim 9, wherein the method further comprising:

obtaining an elevation corresponding to the current location of the electronic device;

determining whether the electronic device and the target vehicle are on the same floor of the parking lot by comparing the obtained elevation with an elevation of the target vehicle contained in the second data package; wherein the electronic device and the target vehicle are on the same floor when an absolute of a difference between the obtained elevation and the elevation of the target vehicle in the second data package is less than or equal to a predetermined elevation; and the electronic device and the target vehicle are at different elevations when an absolute of a difference between the obtained elevation and the elevation of the target vehicle in the second data package is greater than the predetermined elevation.

11. The method according to claim 9, wherein the method further comprising:

sending the second data package to the other vehicles within a preset range;

determining whether at least one candidate vehicle exists among the other vehicles;

confirming a path vehicle from the candidate vehicle when the at least one candidate vehicle exists among the other vehicles, wherein the path vehicle is the last one of the candidate vehicle which has received the first data package;

determining whether the path vehicle is the target vehicle; and receiving the predetermined information of the navigation path when the path vehicle is the target vehicle, wherein the predetermined information comprising identifications and locations of the target vehicle and the path vehicle.

12. The method according to claim 11, wherein the method further comprising:

sending the second data package and identification information of the path vehicle to the other vehicles within a second preset range when the path vehicle is not the target vehicle;

locating the target vehicle according to the second data package and the identification information of the path vehicle and the first data package.

13. The method according to claim 12, wherein the method further comprising:

determining that at least one candidate vehicle exists among the other vehicles when the identification information of the second data package is the same as the identification information of the first data package; and determining that no candidate vehicle exists among the other vehicles when the identification information of the second data package is different from the identification information of the first data package.

14. The method according to claim 11, wherein the method further comprising:

calculating a backpropagation (BP) value of the candidate vehicles based on the first time information and the second time information; and selecting the vehicle with a smallest BP value from the candidate vehicles as the path vehicle.

15. The method according to claim 14, wherein the method further comprising:

receiving identification information of the path vehicle;

determining that the path vehicle is the target vehicle when the identification information of the path vehicle is the same as the identification information of the target vehicle of the second data package; and determining that the path vehicle is not the target vehicle when the identification information of the path vehicle is different from the identification information of the target vehicle of the second data package.

16. A non-transitory storage medium having stored thereon instructions that, when executed by a processor of an electronic device, causes the processor to perform a vehicle locating method, the electronic device communicating with a target vehicle and a plurality of other vehicles, the method comprising:

generating a first data package containing information of a target vehicle;

broadcasting the first data package to other vehicles, the first data package being configured to be received and stored by the other vehicles;
generating a second data package when the electronic device is separated from the target vehicle;
sending the second data package to the other vehicles within a preset range;
locating the target vehicle according to the first data package and the second data package through the other vehicles; and
receiving predetermined information of a navigation path.

17. The non-transitory storage medium according to claim 16, wherein the first data package comprising an identification of the target vehicle, an elevation of the target vehicle, a first time information, and a second time information, and the elevation is a vertical distance between a current location of the target vehicle and sea level, the first time information is a time when the target vehicle is being driven into a parking lot, and the electronic device sends the first data package to the other vehicles, and the second time information is set manually.

18. The non-transitory storage medium according to claim 17, wherein the method further comprising:
obtaining an elevation corresponding to the current location of the electronic device;
determining whether the electronic device and the target vehicle are on the same floor of the parking lot by comparing the obtained elevation with an elevation of the target vehicle contained in the second data package; wherein
the electronic device and the target vehicle are on the same floor when an absolute of a difference between the obtained elevation and the elevation of the target vehicle in the second data package is less than or equal to a predetermined elevation; and
the electronic device and the target vehicle are at different elevations when an absolute of a difference between the obtained elevation and the elevation of the target vehicle in the second data package is greater than the predetermined elevation.

19. The non-transitory storage medium according to claim 17, wherein the method further comprising:
sending the second data package to the other vehicles within a preset range;
determining whether at least one candidate vehicle exists among the other vehicles;
confirming a path vehicle from the candidate vehicle when the at least one candidate vehicle exists among the other vehicles, wherein the path vehicle is the last one of the candidate vehicle which has received the first data package;
determining whether the path vehicle is the target vehicle; and
receiving the predetermined information of the navigation path when the path vehicle is the target vehicle, wherein the predetermined information comprising identifications and locations of the target vehicle and the path vehicle.

20. The non-transitory storage medium according to claim 19, wherein the method further comprising:
sending the second data package and identification information of the path vehicle to the other vehicles within a second preset range when the path vehicle is not the target vehicle; and
locating the target vehicle according to the second data package and the identification information of the path vehicle and the first data package.

21. The non-transitory storage medium according to claim 20, wherein the method further comprising:
determining that at least one candidate vehicle exists among the other vehicles when the identification information of the second data package is the same as the identification information of the first data package; and
determining that no candidate vehicle exists among the other vehicles when the identification information of the second data package is different from the identification information of the first data package.

22. The non-transitory storage medium according to claim 19, wherein the method further comprising:
calculating a backpropagation (BP) value of the candidate vehicles based on the first time information and the second time information; and
selecting the vehicle with a smallest BP value from the candidate vehicles as the path vehicle.

23. The non-transitory storage medium according to claim 21, wherein the method further comprising:
receiving identification information of the path vehicle;
determining that the path vehicle is the target vehicle when the identification information of the path vehicle is the same as the identification information of the target vehicle of the second data package; and
determining that the path vehicle is not the target vehicle when the identification information of the path vehicle is different from the identification information of the target vehicle of the second data package.

* * * * *